UNITED STATES PATENT OFFICE.

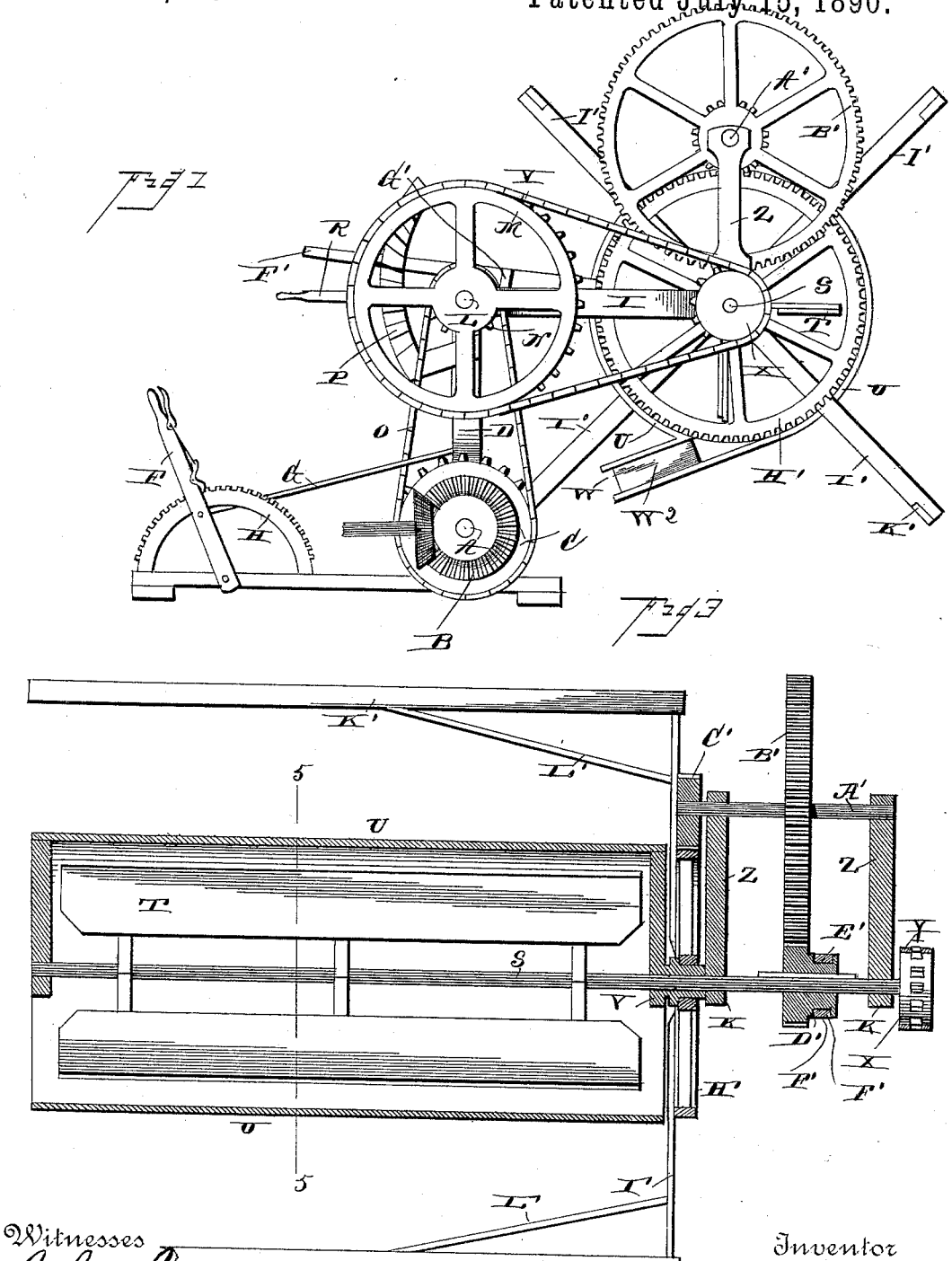

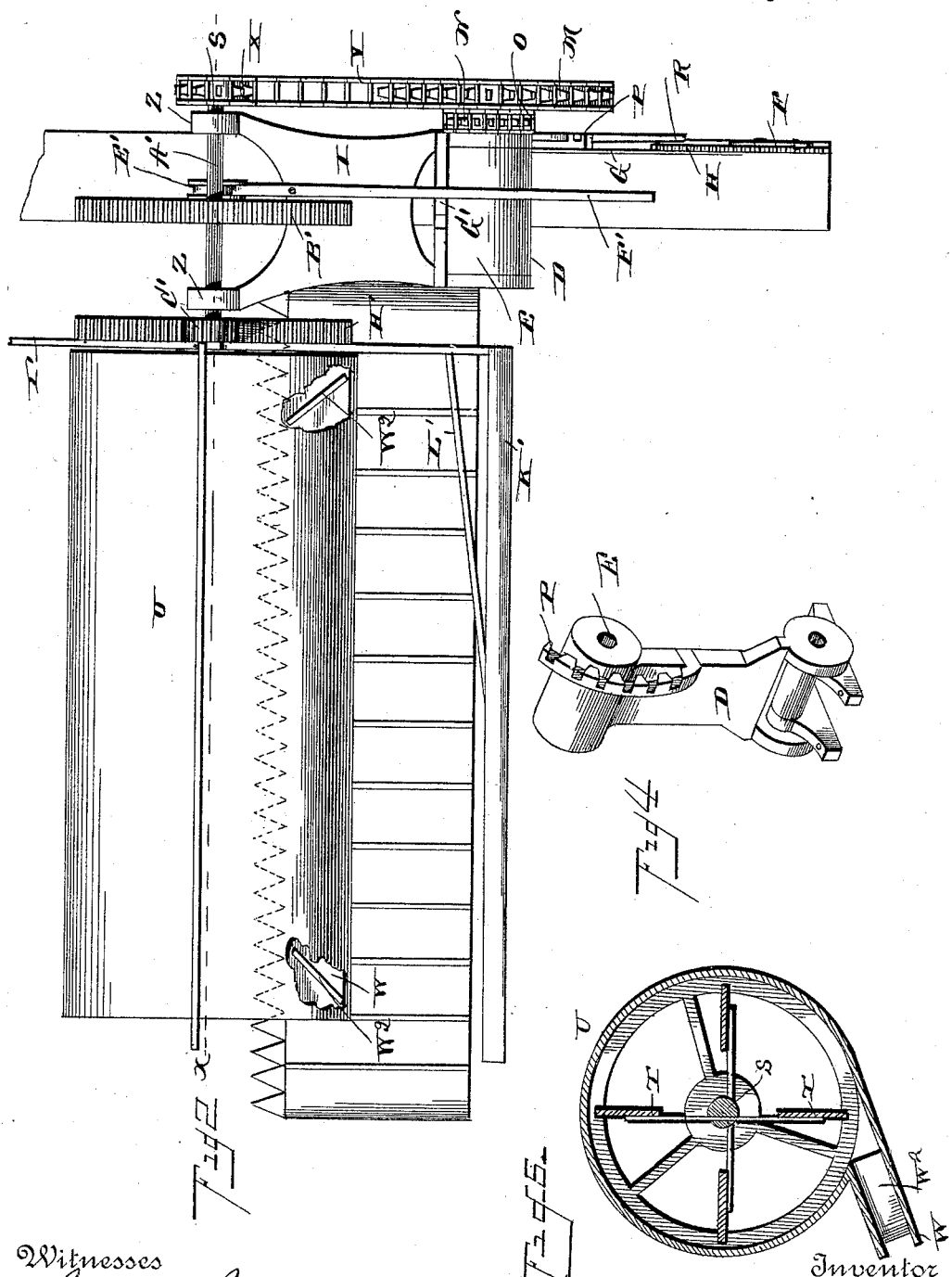

JOHN EDGAR HUDSON, OF CAYUGA, (DAKOTA TERRITORY,) NORTH DAKOTA.

HARVESTER-REEL.

SPECIFICATION forming part of Letters Patent No. 432,048, dated July 15, 1890.

Application filed February 20, 1889. Serial No. 300,555. (No model.)

*To all whom it may concern:*

Be it known that I, JOHN EDGAR HUDSON, a citizen of the United States, residing at Cayuga, in the county of Sargent and Territory of Dakota, have invented a new and useful Improvement in Harvester-Reels, of which the following is a specification.

My invention relates to improvements in harvester-reels; and it consists in the peculiar construction and combination of devices that will be more fully set forth hereinafter, and particularly pointed out in the claims.

In the drawings, Figure 1 is a side elevation of a harvester-reel embodying my improvements. Fig. 2 is a top plan view of the same. Fig. 3 is a sectional view taken on the line $x\ x$ of Fig. 2. Fig. 4 is a detail view. Fig. 5 is a sectional view of the fan-case, taken on the line 5 5 in Fig. 3.

A represents a shaft, which is mounted on one side of the harvester-frame, and is provided with a miter-wheel B, that engages a gear-wheel which is driven by the main sprocket-chain of the harvester.

Secured to and revoluble with the wheel B is a sprocket-wheel C.

D represents an arm or standard, which is pivoted on the shaft A, and is provided at its upper end with a bearing E. A lever F is pivoted to the seat-plank, is connected to the arm D by a rod or link G, and is adapted to engage the toothed or notched sector H, that is secured on the frame, whereby the said lever and the arm D may be secured at any desired position.

I represents an arm, which is provided at its inner end with a pair of ears that bear against opposite ends of the bearing E, and is provided at its outer ends with a pair of ears K. A shaft L passes through aligned openings in the bearing E and in the ears at the inner end of arm I, and thus forms a pivot which connects the arms D and I. Loosely mounted on the said shaft L is a sprocket-wheel M and a small sprocket-wheel N, said wheels M and N being secured together and adapted to rotate in unison. An endless belt or sprocket-chain O connects the wheels C and N.

P represents a sector-plate, which is secured to the arm D, and R represents a spring-lever which is secured to the inner end of the arm I and is adapted to engage the notches of the sector-plate P, and thereby secure the arm I at any desired angle with relation to the arm D.

Journaled in the ears K of arm I is a shaft S of sufficient length to extend across and in front of the cutting apparatus of the harvester, and to the said shaft is secured a rotary fan or blower T. The cylindrical case U, which incloses the said fan or blower, is open at its ends, as shown, and has a hub V at its inner end, which is bolted or otherwise secured to the proximate ear or arm K. Extending transversely on the rear under side of the said casing is a discharge-opening W of suitable width. As shown in Fig. 1, the discharge mouth or opening W of the blower extends the entire length of the blower-case and is turned toward the cutting apparatus and is arranged in advance of the latter.

To the outer end of the shaft S is secured a small sprocket-wheel X, which is connected with the sprocket-wheel M by means of an endless sprocket-chain Y.

Z Z represent a pair of standards or bearings, which are rigid with and rise from the ears K on the outer end of the arm I, in which standards is journaled a shaft A'. A large gear-wheel B' is rigidly secured to the center of the said shaft, and to the inner end thereof is rigidly secured a pinion C'.

Feathered on the shaft S is a pinion D', having a hub on one side provided with an annular groove E'. A lever F', fulcrumed to the arm I, engages groove E', and the said lever is adapted to engage a notched plate G', arranged transversely on the rear end of the arm I, and may thereby be secured at any desired position. By means of the said lever the pinion D' may be thrown into or out of engagement with the wheel B'.

H' represents a gear-wheel, which is journaled on the hub V of the case and engages the pinion C'. Secured to the inner side of the said wheel are a series of radial arms I', and to the outer ends of said arms are secured longitudinal reel-bars or beaters K'. Braces L' connect said bars or beaters and said arms and stiffen the connection between them. The said arms I' and the bars or beaters K' constitute the reel.

The operation of my invention is as follows:

When the machine is in motion, the rotation of the driving-wheel is transmitted by means of the sprocket-wheels C N M X and sprocket-chains O Y to the shaft S, thereby causing the fan or blower to revolve and force a blast of air rearward through the opening W of sufficient strength to incline the standing grain rearward over the cutting apparatus and hold it while being cut and cause the said grain to fall transversely on the usual traveling apron or carrier in rear of the cutting apparatus with all the heads of the grain extending in one direction, and thereby facilitate the bundling and binding of the grain. When the pinion D' is in engagement with the wheel B', rotary motion is communicated to the shaft A', and the pinion C' on said shaft, by engaging the gear H', causes rotary motion to be imparted to the reel, and the latter operates on the grain which may have been beaten down by the wind and rains and causes it to be delivered to the cutting apparatus. The function of the jointed standard D and arm I and of the levers which operate and secure the same is to enable the reel to be adjusted to any desired height and moved forward or back to any desired distance from the cutting apparatus. The reel-bars are of a length equal to the width of the platform of the cutting apparatus, and the platform is provided on each side with projecting grain-dividers, as usual in this class of machines.

The discharge-opening of the fan or blower case is provided with obliquely-arranged deflectors $W^2$, which assist in directing the air-blast toward the standing grain along the entire length of the reel.

Having thus described my invention, I claim—

1. The combination, with the harvester and its cutting apparatus, of a blower arranged in advance of and with its mouth turned toward the cutting apparatus.

2. The combination, with a harvester cutting apparatus, of a case carrying a fan and provided its entire length with a discharge-mouth which is applied in advance of and with its mouth turned toward the cutting apparatus.

3. In a harvester-reel, the combination of the shaft S, the fan or blower secured to said shaft, the casing secured firmly to one of the bearings of the shaft, the wheel H', journaled on the hub of the casing, the reel-arms secured to said wheel, and the shaft A', geared to the wheel H' to drive the same, and itself driven by a pinion on the shaft S, substantially as described.

4. The combination of the pivoted arm D, the arm I, pivotally connected to the upper end of the arm D, levers to secure said arms at any desired position, the sprocket-wheel C, the sprocket-wheels M N, journaled on the shaft, forming the pivot of the arm I, the endless chain or belt connecting the wheels C N, the shaft S, journaled in the arm I and having the fixed sprocket-wheel X, the endless chain or belt connecting the wheels X N, the blower or fan secured to the shaft S, the casing fixed to one of the shaft-bearings, the loose wheel H', carrying the reel-arms and journaled on the hub of the casing, the shaft A, journaled in the arm I and having the pinion engaging wheel H', the gear-wheel B', secured to said shaft, the pinion D', feathered on shaft S, and the lever to throw said pinion into and out of engagement with wheel B', substantially as described.

5. In a rotary fan for harvester-reels, the combination, with the fan-case, having the blast-opening extending along the entire length of the reel from the radial arms of the latter, of the deflectors arranged obliquely in said blast-opening, substantially as and for the purpose set forth.

6. The combination, in a harvester-reel, of the fan-case having a sleeve or hub formed centrally upon its inner head or end, the gear-wheel journaled upon said sleeve, the radial arms of the reel attached thereto carrying the horizontal beaters outside the case, the fan-shaft extending through said sleeve and carrying the fan, and suitable operating mechanism, substantially as set forth.

In testimony that I claim the foregoing as my own I have hereto affixed my signature in presence of two witnesses.

JOHN EDGAR HUDSON.

Witnesses:
JOSEPH L. BARNSTABLE,
GEORGE F. HUDSON.